United States Patent
Richter et al.

(10) Patent No.: US 6,600,704 B2
(45) Date of Patent: *Jul. 29, 2003

(54) APPARATUS FOR SCANNING OPTICAL RECORDING MEDIA HAVING DIFFERENT INFORMATION CARRIER LAYERS

(75) Inventors: Hartmut Richter, Villingen-Schwenningen (DE); Christoph Dietrich, Heidelberg (DE)

(73) Assignee: Thomson Licensing, S.A., Boulogne-Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,119

(22) Filed: Dec. 21, 1999

(65) Prior Publication Data
US 2003/0026189 A1 Feb. 6, 2003

(30) Foreign Application Priority Data
Dec. 21, 1998 (DE) .......................... 198 59 035

(51) Int. Cl.⁷ ................................ G11B 7/00
(52) U.S. Cl. ................ 369/44.23; 369/44.37; 369/94
(58) Field of Search .................. 369/94, 44.23, 369/53.13, 53.76, 53.27, 53.36, 53.19, 13.29, 44.37, 124.11, 124.12, 44.38, 116

(56) References Cited

U.S. PATENT DOCUMENTS

| | | | |
|---|---|---|---|
| 4,334,300 A | | 6/1982 | Arquie et al. .............. 369/46 |
| 4,908,813 A | * | 3/1990 | Ojima et al. ................ 369/94 |
| 4,985,880 A | * | 1/1991 | Yoshida et al. .......... 369/53.36 |
| 5,093,821 A | | 3/1992 | Katayama et al. .......... 369/112 |
| 5,511,057 A | * | 4/1996 | Holtslag et al. .............. 369/94 |
| 5,526,336 A | | 6/1996 | Park et al. .................... 369/94 |
| 5,526,338 A | | 6/1996 | Hasman et al. ............. 369/109 |
| 5,546,372 A | * | 8/1996 | Ohsawa et al. .......... 369/53.19 |
| 5,550,800 A | * | 8/1996 | Zucker et al. ............... 369/116 |
| 5,696,749 A | | 12/1997 | Brazas, Jr. et al. ......... 369/109 |
| 5,703,856 A | | 12/1997 | Hayashi et al. ............... 369/54 |
| 5,768,221 A | * | 6/1998 | Kasami et al. ................ 369/94 |
| 6,094,410 A | * | 7/2000 | Fan et al. ..................... 369/94 |

FOREIGN PATENT DOCUMENTS

| | | |
|---|---|---|
| DE | 19636595 | 3/1998 |
| DE | 19712573 | 10/1998 |
| EP | 0029755 | 7/1983 |
| EP | 0837455 | 4/1998 |
| EP | 0994469 | 4/2000 |

OTHER PUBLICATIONS corresponds to cited EPO reference 0029755.
German Search Report citing the above–listed references: AA, AM, and AN.

* cited by examiner

*Primary Examiner*—Thang V. Tran
(74) *Attorney, Agent, or Firm*—Joseph S. Tripoli; Joseph J. Laks; Reitseng Lin

(57) ABSTRACT

An apparatus for simultaneously reading from or writing to different information carrier layers of an optical recording medium having at least two different information carrier layers, the apparatus comprising partial beam generating means for generating different partial beams, focusing means for focusing the partial beams onto different information carrier layers and detection means for detecting the partial beams. The present invention provides a largely common optical path for the individual partial beams and is nevertheless tolerant with regard to deviations in the spacing of individual information carrier layers from one another. This object is achieved by virtue of the fact that a partial beam generating means is provided for coupling out a partial beam and a beam influencing means is provided for independently influencing the coupled-out partial beam. The apparatus according to the invention is suitable for both recording media having read-only information carrier layers and for recording media having write-once or write-many information carrier layers.

6 Claims, 2 Drawing Sheets

APPARATUS FOR SCANNING OPTICAL RECORDING MEDIA HAVING DIFFERENT INFORMATION CARRIER LAYERS

FIELD OF THE INVENTION

The present invention relates to an apparatus for simultaneously reading from or writing to different information carrier layers of an optical recording medium having at least two different information carrier layers.

BACKGROUND OF THE INVENTION

Recording media of this type are used for increasing the data capacity. In this case, the information carrier layers are semi-transparent and are each arranged parallel to one another. Their spatial separation is typically from 30 to 50 $\mu$m with a tolerance of ±5 $\mu$m. Crosstalk during the read-out of the data is suppressed on account of the spatial separation. For numerous applications, it may be expedient to read out data simultaneously from two or more information carrier layers, or to read out data and simultaneously write in other data. Simultaneously reading from or writing to two or more information carrier layers requires light to be focused correctly onto the generally spirally or circularly arranged data tracks of the various information carrier layers and the corresponding focal points to be tracked in the tracking direction, that is to say generally perpendicularly to the direction of the track, in the plane of the tracks. Since, on account of manufacturing tolerances, the information carrier layers are neither arranged exactly equidistantly over the entire plane of the recording medium, and nor do the data tracks lie congruently one above the other, it is necessary to track the two focal points both axially, that is to say in the direction of focus, and laterally, that is to say in the tracking direction i.e. perpendicular to the track. Simultaneous reading or writing likewise enables the data rate to be increased. One possible way of reading two or more layers in parallel consists in using two or more scanners. However, this is complicated and expensive.

EP-A-0 837 455 discloses an apparatus for simultaneously reading from or writing to different information carriers of an optical recording medium having at least two different information carrier layers. This apparatus manages with a single scanner. It has a partial beam generating means for generating different partial beams, a focusing means for focusing the partial beams onto different information carrier layers and a detection means with at least one detector element for each partial beam. The known apparatus may be regarded as having the disadvantage that the partial beams traverse a largely common optical path, as a result of which only slight tolerances with regard to the spacing of the information carrier layers from one another and the relative deviation of information tracks of the different information carrier layers laterally with respect to one another are tolerated.

SUMMARY OF THE INVENTION

An object of the present invention is to propose an apparatus which provides a largely common optical path for the individual partial beams and is nevertheless more tolerant with regard to the aforementioned deviations.

To that end, according to the invention, at least one partial beam generating means is provided for coupling a partial beam into and out of a pencil of rays and also a beam influencing means is provided for independently influencing the coupled-out partial beam. This has the advantage that a largely common optical path can be used for the concentrated partial beams from their generation through to the detection, as a result of which a small number of components, a compact structure of the scanner and lower production costs are made possible. Nevertheless, it is possible to correct tolerances with regard to the spacing of the individual information carrier layers from one another and individual information tracks of different information carrier layers with respect to one another, the read-out and writing reliability thereby being increased. That means that track following or focussing or both is, according to the invention, performed individually for at least two different partial beams. It likewise lies within the scope of the invention to use a partial beam generating means only for coupling in a partial beam or only for coupling out a partial beam.

A focusing means for focus and track regulation is advantageously provided as beam influencing means for each partial beam. This has the advantage of being cost-effective since it is possible to use conventional focusing means the number of which is merely increased. A further advantage resides in the fact that it is possible to compensate for large tolerances since the focusing means enable relatively large amounts of travel both in the axial direction and in the lateral direction. In this case, it is likewise possible simultaneously to scan on a single information carrier layer. In this context, scanning means not only reading, writing, following without reading or writing but also reading and writing an information track of an information carrier layer.

The partial beam generating means is advantageously a polarizing beam splitter. This means that only a single component is necessary for this. A further advantage resides in the fact that a different intensity of the partial beams can be set by rotating the plane of polarization of the incident beam, for example by means of rotating a laser serving as the light source. This is particularly advantageous when the intention is to use one partial beam to effect reading but the other to effect writing, since writing generally necessitates a higher power. However, the variability of the intensities is also advantageous for other applications, for example for reading from an information layer which is situated at a deeper level with respect to the entry plane of the light into the recording medium by means of a higher intensity in comparison with reading from an information carrier layer which is situated at a higher level. Compensation of the greater attenuation of the corresponding partial beam due to the larger number of information carrier layers to be traversed is obtained as a result of this.

The invention provides a divider, at one input of which a detector output signal associated with one of the partial beams is present and at the other input of which a signal corresponding to the control signal for the power of the light source is present. This has the advantage that, by virtue of the division of detector output signal by light source power, even in the event of modulation of the light source power, a data signal which is not interfered with by this modulation is generated. Modulation of this type is employed particularly in the case of writing to an information carrier layer, as a result of which, however, crosstalk to the other partial beam, that is to say modulation of this partial beam, is effected if the latter originates from the same light source. Crosstalk of this type is avoided according to the invention.

A further variant of the invention provides for a single focusing means but different beam influencing means to be provided for a plurality of partial beams. This has the advantage that only a single focusing means is necessary, which focuses all the partial beams onto their respective information carrier layer and uniformly tracks the corresponding information tracks. A beam influencing means is provided in each case for the second and each further partial beam and influences these independently of the first partial beam. The first partial beam is provided without separate beam influencing means but may likewise have one if required. Variations in the spacing of the information carrier layers from one another and the information tracks in the lateral direction with respect to one another are carried out separately for each of the partial beams, while the coarse tracking is effected by way of the common focusing means.

The invention provides for the partial beam generating means to have a dedicated light source for each partial beam. This has the advantage that it is possible to simultaneously write different contents on a plurality of information carrier layers without crosstalk occurring, since the power of the light sources can be regulated individually. This measure likewise has the advantage that reading can be effected with different power.

The beam influencing means is advantageously a collimator lens. The collimator lens, which is present in any case, is thus also used as beam influencing means with only a small additional outlay. For this purpose, it is arranged such that it can move in the axial and/or lateral direction and is provided with corresponding actuators. The latter may be electromagnetically actuated actuators of the kind known for driving the focusing means, piezoelectric, magnetostrictive or other suitable actuators.

As an alternative to this or in addition, it is provided that the beam influencing means has an optically transparent element which is tuneable in terms of the refractive index. In the simplest case, the said element is a glass plate which is introduced into the beam path or is removed therefrom, a plurality of such laminae having a different thickness or a different refractive index, or other suitable elements. This has the advantage that tracking of the focusing is made possible without a high outlay, if appropriate in interaction with further beam influencing means, such as a moveable collimator lens.

According to the invention, light source and associated detector are arranged in an optically conjugate position with respect to one another. This has the advantage that the light spot falling onto the respective detector is not displaced, or is only slightly displaced, by actuation of the beam influencing means.

Further advantages of the invention are specified in the following description of advantageous configurations with reference to the figures. It is understood that the features specified can also expediently be combined and/or modified without departing from the scope of the present invention.

DETAILED DESCRIPTION OF PREFERRED EMBODIMENTS

Figure 1:
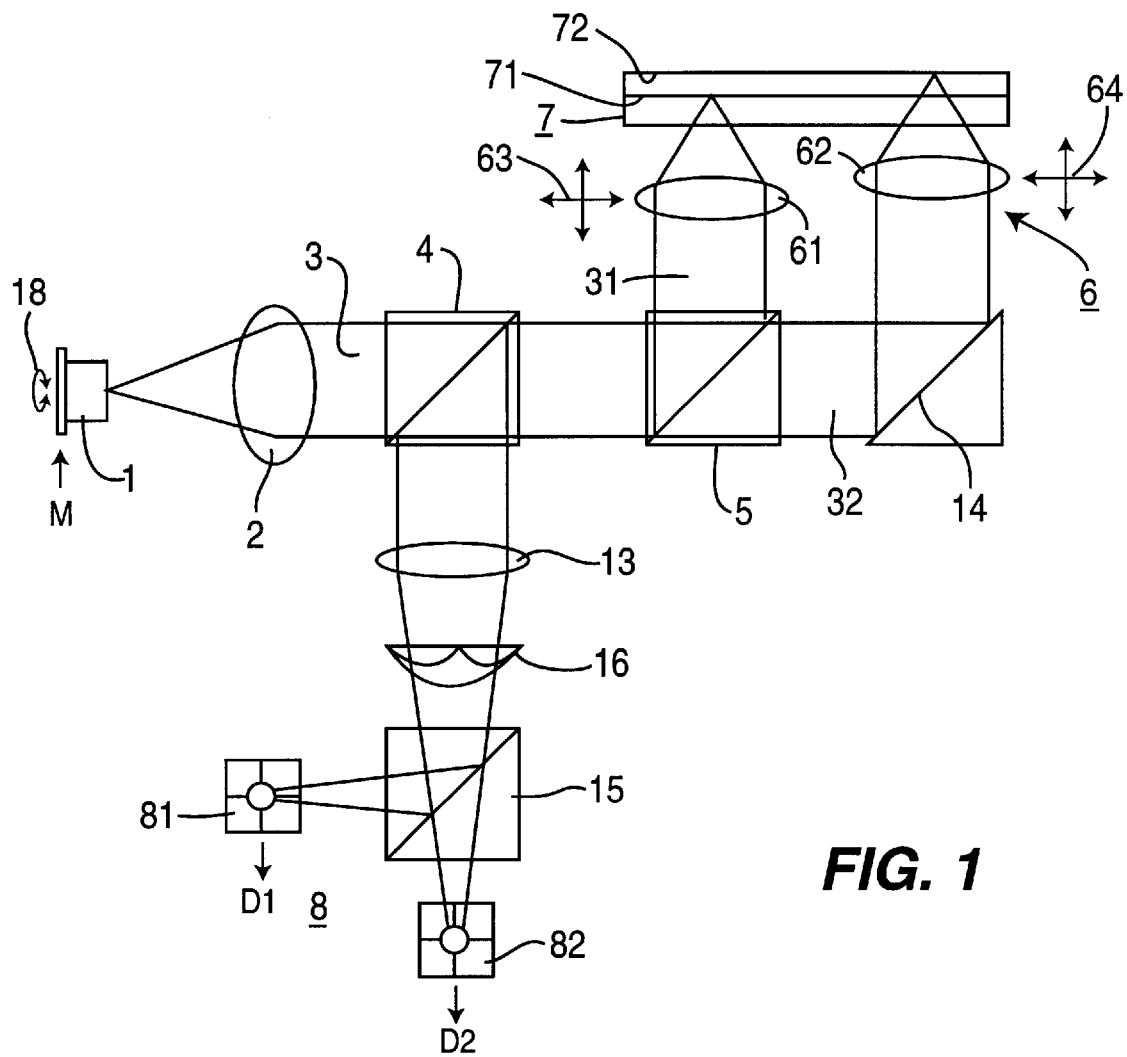
FIG. 1 shows an apparatus according to the invention with two focusing means and one light source.

FIG. 1 shows the essential elements of a scanner of an apparatus according to the invention with two focusing means and one light source. The light source used is a laser diode 1, whose divergent output beam is converted into a parallel beam 3 by a collimator lens 2. After passing through a non-polarizing beam splitter 4, the beam 3 is decomposed into two partial beams 31, 32, which are polarized perpendicularly to one another, by a polarizing beam splitter 5. The partial beams 31, 32 are thus coupled out of the beam 3. The focusing means 6 has, as beam influencing means, a first objective lens 61 and a second objective lens 62, which can be moved in the direction of the double arrows 63, 64 by actuators that are not illustrated here. The first partial beam 31 is focused onto a first information carrier layer 71 of the optical recording medium 7 by the first objective lens 61. The second, coupled-out partial beam 32 is reflected at a mirror 14 and then focused onto a second information carrier layer 72 of the recording medium 7 by means of the second objective lens 62. The objective lenses 61, 62 are actuated independently of one another, with the result that the focal points of first partial beam 31 and second partial beam 32 are tracked independently of one another on the information tracks of the respective information carrier layer 71, 72.

After reflection at the information carrier layer 71, 72, the partial beams 31, 32 pass through the beam splitter 5 in the opposite direction, in which case they are coupled into a pencil of rays represented by the beam 3. This pencil of rays is reflected by the non-polarizing beam splitter 4 in the direction of the detection means 8. In this case, the concentrated partial beams 31, 32 first of all pass through a focusing lens 13 and are then separated by a further polarizing beam splitter 15 and fed to a first detector element 81 and to a second detector element 82, respectively. Instead of a polarizing beam splitter 15, it is also possible to provide a Wollaston Prism or another optical element which splits the incident light beam in accordance with its polarization. In the exemplary embodiment, a cylindrical lens 16 is provided between focusing lens 13 and polarizing beam splitter 15, the said cylindrical lens serving as an astigmatism-producing element in the case where the astigmatism focus method is used. Instead of this focusing method, it is also possible to use any other suitable focusing method in an apparatus according to the invention. The detector elements 81, 82 are designed as four-quadrant detectors; here, too, any other suitable detection method known to a person skilled in the art can be used. The output signals D1, D2 of the detector elements 81, 82 and also a modulation signal M as an input signal, determining the power, of the laser diode 1 are schematically indicated by means of an arrow in each case.

Figure 2:
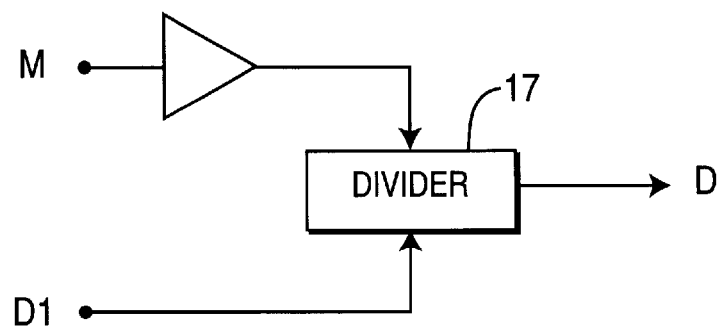
FIG. 2 shows a schematic arrangement for data conditioning.

The writing of pulse length-modulated data to an information carrier layer, which is effected for example according to the so-called phase change method, takes place thermo-optically, that is to say by intensity modulation of the laser diode 1 in accordance with the data signal to be recorded and by corresponding heating of that location on the information carrier layer 71, 72 which is to be written to. In order to optimize the geometrical form of the written information units, the so-called pits, the laser power is additionally pulsed in a manner dependent on the size of the pit to be written. Asymmetries in the pits of different lengths can be avoided in this way. Accordingly, the modulation of the laser diode 1 corresponds to a superposition comprising the modulation in accordance with the data information and the modulation for the writing compensation. Let us assume that the first information carrier layer 71 is a semi-transparent layer that has been written to previously but is non-writable, a so-called ROM layer, and the second information carrier layer 72 is a layer that is rewritable according to the phase change method, a so-called RAM layer. If, with the scanner, data are to be written to the information carrier layer 72 and data are simultaneously to be read from the information carrier layer 71, there results on the first detector element 81 a superposition of the data signal of the first information carrier layer 71, the ROM layer with the high-frequency modulation of the laser diode 1 which is intended for writing to the second information carrier layer 72. Therefore, the data signal detected by the first detector element 81 cannot readily be subjected to further processing without any errors by a decoder (not illustrated here). For this purpose, the invention provides for the output signal D1 of the first detector element 81 and the modulation signal M of the laser diode 1 to be fed to a divider 17, the output signal D of which is proportional to the ratio D1/N, that is to say corresponds to the filtered signal of the first information carrier layer 71. FIG. 2 shows this in a schematic arrangement. In accordance with the exemplary embodiment described above, simultaneous reading of two data tracks is possible, and also simultaneous writing and reading on two different information planes. Simple focusing and tracking are made possible even in the case of large tolerances between the information carrier layers 71, 72. In the case of recording media having more than two information carrier layers, two arbitrary information carrier layers can be accessed simultaneously by means of the exemplary embodiment described. There is also the possibility of data verification during a writing operation. In this case, the two partial beams 31, 32 scan the same track, data being written by means of one partial beam 31, while the written data are read by means of the other partial beam 32. The read data are compared with the input data by a control unit (not illustrated here), and suitable countermeasures are initiated if errors are detected. Consequently, the apparatus according to the invention is suitable both for recording media having one or a plurality of read-only information carrier layers, so-called ROM layers, and for recording media having one or a plurality of write-once or write-many information carrier layers, so-called R, RW or RAM layers. The laser diode 1 is arranged such that it can rotate about the optical axis in accordance with arrow 18. In this way, it is possible to rotate the polarization direction of the parallel beam 3, as a result of which the intensity of the polarized partial beams 31, 32 can be varied relative to one another. This enables the optical power to be distributed as desired between the partial beams 31, 32, which is advantageous in particular for a write-read mode. This embodiment of the invention is not limited to mechanically rotate the laser diode 1. Any other suitable measure to rotate the polarization direction of beam 3 may also be advantageously applied here. The use of two partial beams 31, 32 which are polarized perpendicularly to one another and of the polarization-sensitive detection means 8 enables the crosstalk between the two information carrier layers 71, 72 to be effectively suppressed even in the case of very small spacings.

The focal points of the partial beams 31 and 32 are advantageously arranged one behind the other in the track direction, as a result of which an above-described verification mode is possible without the objective lenses 61 and/or 62 being greatly deflected in the radial direction.

Figure 3:
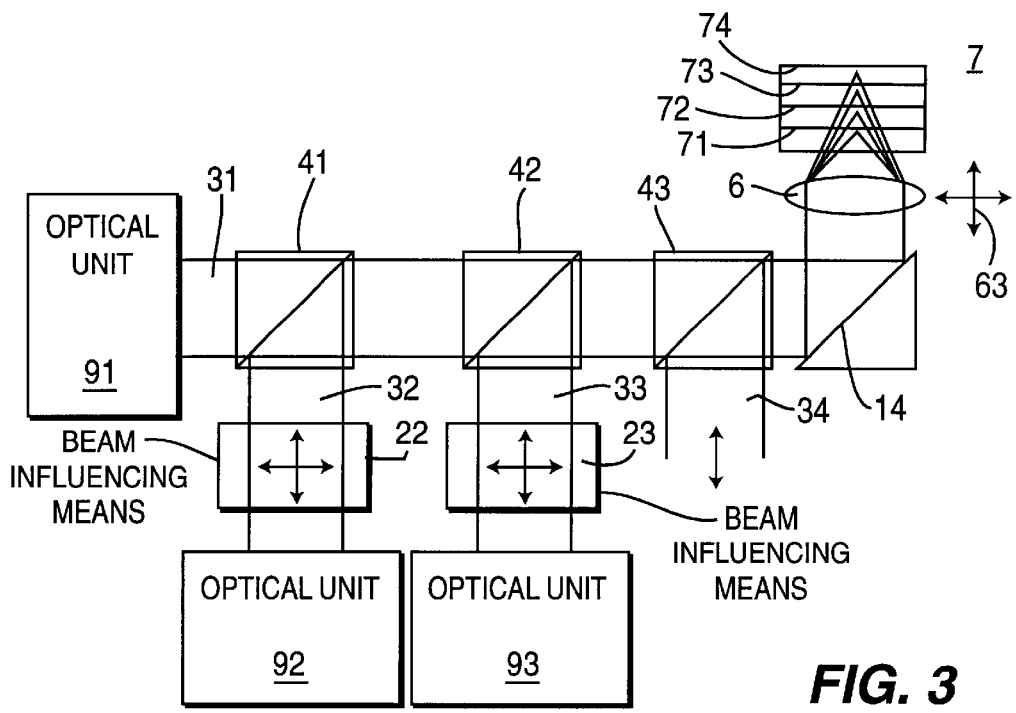
FIG. 3 shows an apparatus according to the invention with one focusing means, a plurality of light sources and a plurality of beam influencing means.

FIG. 3 shows, in a schematic illustration, an apparatus according to the invention with one focusing means 6, a plurality of light sources and a plurality of beam influencing means 22, 23. Partial beam generation and detection are in this case effected in the schematically indicated optical units 91, 92, 93. The first partial beam 31 and second partial beam 32 are combined in a first non-polarizing beam splitter 41, and further partial beams 33, 34 are coupled in in further non-polarizing beam splitters 42, 43. The pencil of rays comprising the combined partial beams 31, 32, is deflected by a mirror 14 to the objective lens 6, which can be moved by means of actuators in the axial and lateral directions for the purpose of focusing and for the purpose of tracking. This is indicated by means of the double arrow 63. When passing through the beam splitters 41, 42, . . . , the respective partial beams 31, 31, . . . , are coupled out again from the returning pencil of rays which comprises the partial beams 31, 32, . . . reflected from the information carrier layers 71, 72, . . . of the recording medium 7.

In the exemplary embodiment, the recording medium 7 has four information carrier layers 71–74. In this case, the detector elements 81, 82, . . . of the optical units 91, 92, . . . are in each case arranged in an optically conjugate manner with respect to the focal points on the information carrier layers 71, 72, . . . . Accordingly, the information carrier layers 72, 73, . . . are imaged in a blurred manner on the first detector element 81 in accordance with the geometrical spacing of the information carrier layers 71, 72, . . . . The same applies correspondingly to the detector elements 82, 83, . . . on which every information carrier layer 72, 73, . . . except for the associated one is imaged in a blurred manner. Consequently, given a sufficient spacing of the information carrier layers 71, 72, . . . from one another, the intensity of the light originating from the respectively unassociated information carrier layers is so low that crosstalk does not or virtually does not occur. The focusing means 6 comprising actuator and objective lens has a large control range and allows the simultaneous tracking of a plurality of focal points of a plurality of partial beams 31, 32, . . . and thus the correction of coarse tolerances. These include for example the vertical wobble, which can typically amount to up to ±0.5 mm in the case of optical recording media, and also the eccentricity of the recording medium, which can amount to up to ±280 $\mu$m. By way of example, a detector signal obtained from the first optical unit 91 is used as the regulating signal for the focusing means 6. As already described above, the information carrier layers 71, 72, . . . generally do not have a constant spacing from one another on account, inter alia, of manufacturing tolerances. In this case, the spacing varies both from recording medium to recording medium and within a single recording medium. The information tracks on the different information carrier layers 71, 72, . . . also do not generally correspond in terms of their lateral position with respect to one another. The second partial beam 32 is therefore readjusted correspondingly by the second beam influencing means 22. The regulating signal for this is determined from the signal detected in the optical unit 92. Correspondingly, the further partial beams 33, 34, . . . are readjusted by corresponding further beam influencing means 23, 24, . . . However, only a small control range is required for the beam influencing means 22, 23, . . . , since only the relative tolerances with respect to the first information carrier layer 71 have to be corrected.

Figure 4:
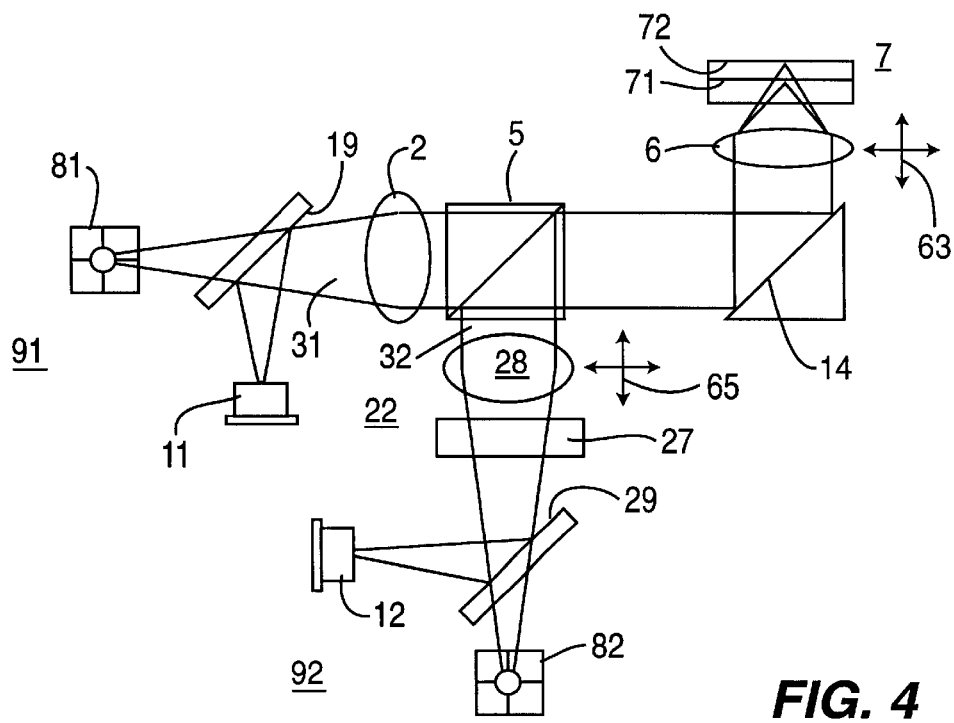
FIG. 4 shows an apparatus according to the invention with one focusing means, two light sources and one beam influencing means.

FIG. 4 shows an apparatus according to the invention corresponding to FIG. 3 which has just two optical units 91, 92. The latter each comprise, in principle, a laser diode 11, 12, a semi-transparent mirror 19, 29 and a detector element 81, 82. Instead of a non-polarizing beam splitter, a polarizing beam splitter 5 is provided, with which first of all the first partial beam 31 after passing through the collimator lens 2 and the second partial beam 32 after passing through the beam influencing means 22 are combined. The combined beam is directed to the objective lens 6 by the mirror 14 and focused by the said objective lens onto the information carrier layers 71 and 72, respectively, of the recording medium 7. For the sake of simplicity, only two information carrier layers 71, 72 are illustrated here, but the recording medium 7 may perfectly well have further information carrier layers as well. The focusing lens 6 can be moved by an actuator (not illustrated here) in accordance with the double arrow 63. In this case, the laser diodes 11, 12 are oriented in such a way that the partial beams 31, 32 are polarized perpendicularly to one another when they reach the polarizing beam splitter 15. This has the advantage that virtually no loss of optical power occurs at the polarizing beam splitter 5, which increases the efficiency of the apparatus. The collimator lens 28 is provided as the second beam influencing means 22, which collimator lens belongs to the second laser diode 2 and corresponds to the lens 13 from FIG. 1. It can be moved by means of an actuator (not illustrated here) in accordance with the directions indicated by the double arrow 65. It should be noted that, as a result of the influencing by the collimator lens 28, the partial beam 32 no longer corresponds exactly to the beam course illustrated between collimator lens 28 and recording medium 7. The partial beam 32 is both laterally displaced and becomes slightly convergent or divergent. This effect and also corresponding effects in the exemplary embodiments are not taken into account in the schematic illustrations of the figures for the sake of simplicity. As a supplementation or as an alternative to the collimator lens 28, an optically transparent element 27 which is tuneable in terms of the refractive index is represented in FIG. 4. Focus regulation is possible with the aid of the element 27 since the optical path length between laser diode 12 and/or detector element 82 and collimator lens 28 and thus also between objective lens 6 and information carrier layer 72 can be readjusted within certain limits.

The exemplary embodiments described in FIGS. 3 and 4 also enable simultaneous reading of two or more data tracks in different information carrier layers 71, 72, . . . and also simultaneous writing and reading on two or more different information carrier layers. On account of the use of a plurality of laser diodes 11, 12, . . . , simultaneous writing on a plurality of information carrier layers 71, 72, . . . is also possible. The apparatus is suitable both for recording media having information carrier layers with predetermined, invariable data contents and for recording media having writable and/or rewritable information carrier layers, for example acting according to the phase change system. On account of the use of unpolarized light, in the exemplary embodiment according to FIG. 3, it is possible to generate more than two partial beams 31, 32, . . . for the purpose of writing or reading.

What is claimed is:

1. Apparatus for simultaneously scanning different information carrier layers of an optical recording medium having at least two different information carrier layers, the apparatus comprising a light source for generating a light beam;

at least one partial beam generating means for generating different partial beams;

detection means for detecting the partial beams and the light beam, wherein:

at least one of said partial beam generating means is provided for coupling a partial beam in and out of a pencil of rays;

a single focusing means is provided for focusing the partial beams and the light beam onto different information carrier layers; and a plurality of independently adjustable beam influencing means are provided for independently adjusting the focus positions of the partial beams.

2. Apparatus according to claim 1, wherein the partial beam generating means has a dedicated light source for each partial beam.

3. Apparatus according to claim 1, wherein the beam influencing means has a collimator lens.

4. Apparatus according to claim 1, wherein the beam influencing means has an optical transparent element which is tuneable in terms of the refractive index.

5. Apparatus according to claim 1, further comprising a divider having a first input coupled an output signal detected by a detector element in the detector means and a second input coupled to a modulation signal which controls the power of the light source, the divider delivering at an output an output signal which is not interfered with the modulation of the light source.

6. Apparatus according to claim 1, wherein the light source and associated detection means are arranged in an optically conjugate position with respect to one another.

* * * * *